W. F. STIMPSON.
SCALE.
APPLICATION FILED AUG. 24, 1903.
941,590.
Patented Nov. 30, 1909.
2 SHEETS—SHEET 1.
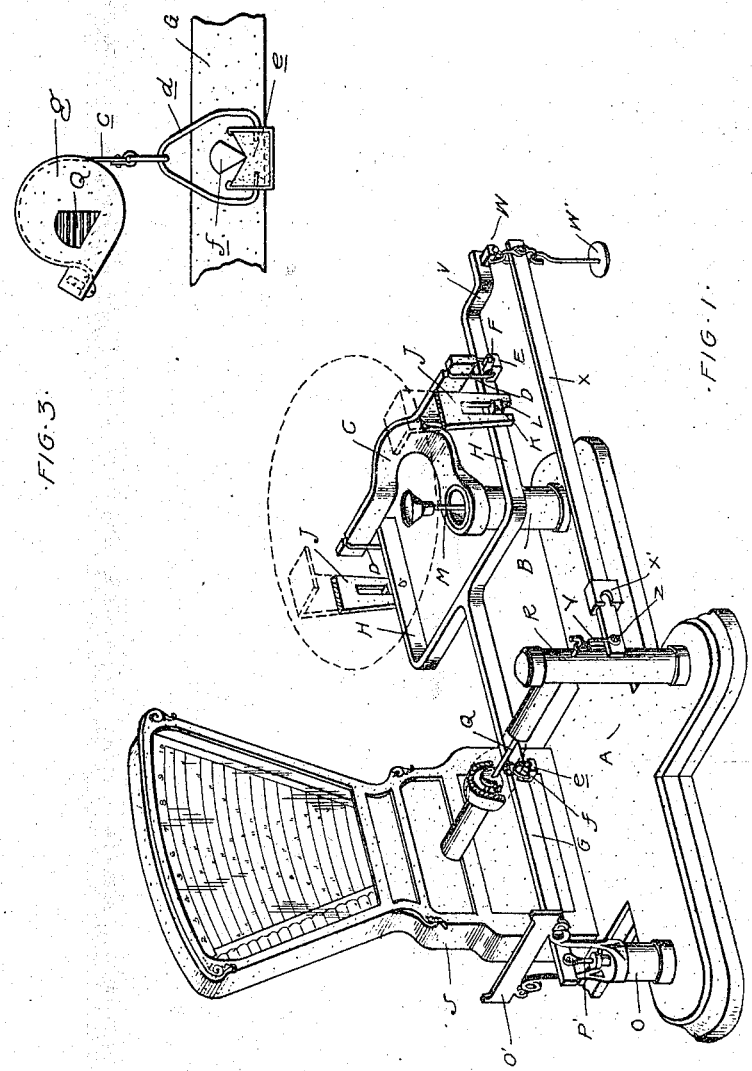
WITNESSES
INVENTOR
WALTER·F·STIMPSON·
BY
ATTYS.

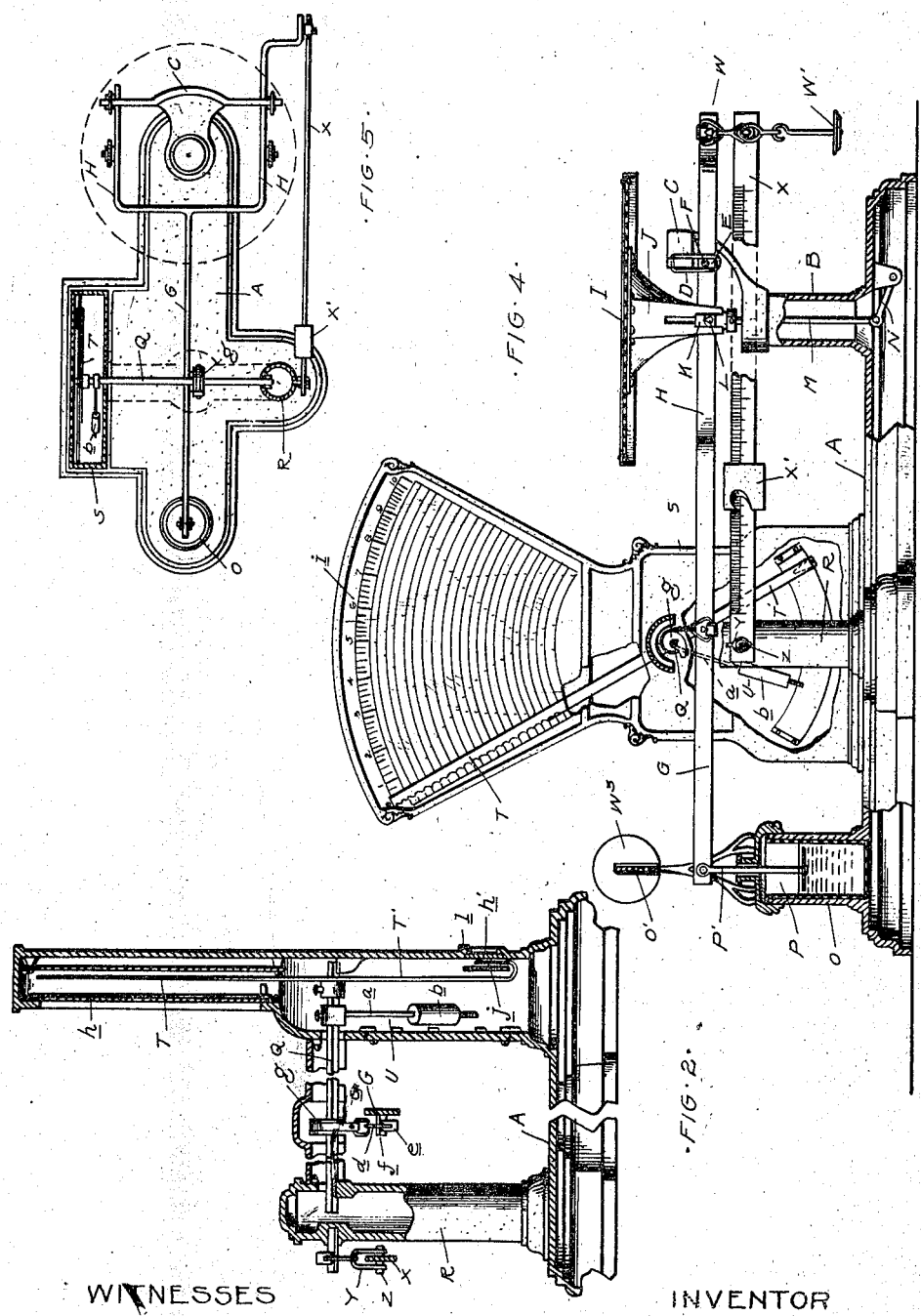

UNITED STATES PATENT OFFICE.

WALTER F. STIMPSON, OF DETROIT, MICHIGAN.

SCALE.

941,590.

Specification of Letters Patent. Patented Nov. 30, 1909.

Application filed August 24, 1903. Serial No. 170,653.

*To all whom it may concern:*

Be it known that I, WALTER F. STIMPSON, residing at Detroit, in the county of Wayne and State of Michigan, a citizen of the United States, have invented certain new and useful Improvements in Scales, of which the following is a specification, reference being had therein to the accompanying drawings.

The invention relates to scales of that type in which the weighing is effected by a variably resisted movement of the weighing pan, which movement is indicated by a traveling index.

It is one of the objects of the invention to provide means for returning the index after it has reached the limit of its movement by the use of a detachable weight, thus adapting the scale for the indication of higher denominations.

It is a further object to provide a convenient arrangement and a simple construction of parts as will be hereinafter set forth.

In the drawings Figure 1 is a perspective view of the scale with the weighing platform removed but indicated by dotted lines. Fig. 2 is a cross section. Fig. 3 is an enlarged view showing the connection between the beam, and the variable resistance and indicator. Fig. 4 is a longitudinal section through the scale. Fig. 5 is a sectional plan view.

A is a suitable base, at one end of this base is arranged the upwardly projecting hollow standard B which carries at its upper end the cross bar C. This cross bar serves as a support for the links D, arranged at opposite ends thereof, and which carry the bearings E for the fulcrum pivots F of the beam. The beam G is arranged to extend longitudinally above the base, and at one end is bifurcated, the furcations H extending into proximity to the links D, and carrying the knife edge pivots F. Thus the fulcrum pivots F are separated from each other by substantially the length of the cross bar C, and form a suitable support for the beam, while at the same time the links permit of absolutely free movement of the beam.

I is the weighing platform which is arranged centrally above the standard B, and cross bar C. This platform is supported by depending feet J at opposite sides thereof, which carry pivotal bearing blocks K, and the latter are supported upon knife edge pivots L, projecting from the furcations H of the beam. The platform I is held from lateral movement by the centrally depending rod M, passing within the hollow standard B, and connected at its lower end with the pivotal link N, fulcrumed substantially in the vertical plane of the fulcrum pivots F of the beam.

The free end of the beam G extends above the hollow standard O on the base, in which is arranged a dash pot P, this preferably contains oil or other liquid retarding medium. The piston P' of the dash pot extends upward and is pivotally connected to the beam G.

Extending transversely of the base, and above the beam G is the rock shaft Q, this is pivoted at one end in bearing in standard R, rising from the base, and at its opposite end in a hollow casing S, also rising from the base, the casing S contains the index hand T and the variable resistance U, both of which are connected to the rock shaft Q.

In the construction shown the variable resistance U is in the form of a pendulous weight, the arm *a* of which is secured to, and depends from the rock shaft Q. *b* is a weight which is adjustably secured to the rod *a* preferably by a screw threaded engagement therewith.

The connection between the shaft Q and the beam G is preferably formed by a flexible link *c* which at its lower end is connected to the loop *d* pivotally supporting the bearing block *e* engaging with a knife edge pivot *f* on the beam.

The upper end of the link is secured to a cam or eccentric pulley *g* on the shaft Q. Thus when the beam is depressed under the actuation of the weight of the platform I the link *c* will draw upon and rotate the pulley *g* thereby swinging the pendulous weight U and the index hand T. The rotation of the shaft will continue until the weight U has been deflected laterally a sufficient distance to balance the weight upon the platform.

With the construction as thus far described the scale is adapted for weighing any article within the limit of movement of the pendulous weight, and indicator. The latter extends to the upper end of the casing S, which is of a flaring fan shape, and the index is exhibited through a transparent face *h* in conjunction with weight indications *i*. In order that the indicator may be visible on the opposite side of the casing S, I preferably provide an auxiliary index T' extending downward from the shaft Q and having the upturned index joint j. The latter is exhibited through a segmental window h' in connection with indications l on the casing, corresponding to the indications i. For a computing scale a computing chart is arranged below the weight indications.

To increase the capacity of the scale I provide detachable weights, which in use are adapted to return the index hands, and the pendulous weight thereby permitting them to again operate. For this purpose one of the furcations H of the beam G is preferably extended beyond its fulcrum F, and at the free end of this extension V is a link W connecting it to auxiliary beam X. The beam X is fulcrumed at its opposite end by means of the swinging link Y suspended from the standard R, and which engages the knife edge bearing Z on the beam. X' is a poise slidably engaging the beam X, and W' is a counter poise depending from the beam preferably in line with the link W.

With the construction just described the beam X may be used as a tare beam or as an auxiliary beam. I preferably, however, employ it as a tare beam, and for increasing the weighing capacity of the scale, use detachable weights W³. These are adapted to fit upon the counter poise W' and when not in use may be arranged on a supporting bar O' arranged above the beam on the standard O.

From the description above given the operation of the scale will be understood, but in brief the operation is as follows,— Supposing the limit of movement of the indicator T to be ten pounds, the scale will be adapted for weighing any article of under ten pounds weight, without the use of the auxiliary weights W³. When the article to be weighed is over ten pounds one or more of the auxiliary weights W³ may be placed upon the counter poise W'. If these weights are each equivalent to ten pounds the indicator T will indicate the excess of weight over ten pounds, but of higher denominations. The beam X may be used as a tare beam in the usual way, and if needed may be used as an auxiliary to the detachable weights W³.

It will be noticed that the beam X is fulcrumed on the standard, and only acts with its effective weight upon the weighing beam G. This avoids the increasing dead weight upon the bar, which is occasioned by the use of an auxiliary beam, entirely carried by the main beam. This construction also avoids the use of any counter weight, which would normally load the beam, and increase the pressure on the pivots.

What I claim as my invention is,—

1. In a scale, the combination with a beam bifurcated to form separate fulcrum pivots, one of the furcations being relatively longer than the other and an auxiliary beam secured at one end to said elongated furcation and at the other to a stationary member of the scale.

2. In a scale, the combination with a beam, of a variable resistance and indicator associated therewith intermediate its ends, a platform supported upon said beam intermediate its fulcrum and said variable resistance, said beam having an offset extension, a counterpoise secured to said offset extension upon the opposite side of the fulcrum of the beam, and a detachable weight for engagement with the counterpoise.

3. A scale comprising a base, a horizontally-extending beam fulcrumed thereon, a variable resistance for said beam, a platform support on and above said beam, an indicator operatively connected with said beam and located at the rear of said base, and a poise beam operatively connected to the first mentioned beam, and located at the front of said base.

4. In a scale, the combination with a beam bifurcated to form separate fulcrum pivots, one of the furcations being relatively longer than the other, an auxiliary beam supported at one end by said longer furcation, and a link supporting the opposite end thereof secured to a stationary member of the scale.

5. A scale comprising a base, a beam fulcrumed thereon, a variable resistance for said beam, a platform support on and above said beam, an indicator operatively connected with said beam and located at the rear of said base, a poise beam operatively connected to the first mentioned beam and located at the front of said base, and a counterpoise connected to said poise beam.

6. In a scale, the combination with a beam bifurcated at one end to form separate fulcrum pivots, a dash pot connection at the opposite end of said beam, a weighing platform having oppositely disposed downwardly extending bearings pivotally supported on the respective furcations of the bifurcated portion of said beam intermediate said fulcrum pivots and said dash pot, a rock shaft extending transversely of said beam and connected thereto intermediate its fulcrum and dash pot, and an indicator and variable resistance operatively associated with said rock shaft.

7. In a scale, the combination with a base, of a standard extending upwardly from one end thereof, a cross bar extending across the base and having a central connection with said standard, a beam having a bifurcated end, pivotal bearing links extending downwardly from said bar, fulcrum pivots on the respective furcations of the beam associated with said links, a dash pot connected to the opposite end of said beam, an indicator and variable resistance, and an operating connection between said beam and indicator, intermediate the furcations thereof and its connection with the dash pot.

8. The combination with a beam and a weighing platform supported thereon, of an indicator casing, a rock shaft extending transversely of and connected to the beam intermediate its ends and without the casing, a weight and indicator connected to the rock shaft within the casing, a standard on the platform opposite the casing, and means for connecting the respective ends of the rock shaft to said casing and standard.

9. In a scale, the combination with a beam, of an indicating casing having exhibiting windows spaced vertically from one another, and like indications adjacent the respective windows, a rock shaft associated with the beam intermediate its ends, and simultaneously operable oppositely disposed index hands, connected to the shaft within said casing, and extending respectively into adjacence with said exhibiting windows.

10. In a scale, the combination of a beam bifurcated to form separate fulcrum pivots, one of the furcations being relatively longer than the other, an auxiliary beam supported at one end of said longer furcation, and a stationary support from which the opposite end of the auxiliary beam is suspended.

11. In a scale, the combination with a beam, of an indicating casing having exhibiting windows at its upper and lower ends and indications adjacent the respective windows, a rock shaft associated with the beam, and simultaneously operable index hands connected to the shaft within the casing, and extending respectively upwardly and downwardly into adjacence with said exhibiting windows, the downwardly extending end having an upwardly turned indicating point at its lower end.

12. In a scale, the combination with a base, of a beam fulcrumed adjacent the outer end thereof, a variable resistance and indicator operatively connected together adjacent the inner end, a platform supported above the beam and associated therewith a dash pot for the beam intermediate said fulcrum and said variable resistance and indicator, a counterpoise upon the outer end of the beam, detachable weights for the counterpoise, and a support on the dash pot for said detachable weights.

13. In a scale having a suitable base, the combination of a standard thereupon intermediate its ends and to one side thereof, a longitudinally extended beam supported above the base, a platform upon the beam, a casing upon one side of the base opposite said standard, an indicator within the casing, a rock shaft therefor supported at its respective ends upon said standard and casing, and operatively associated with the beam intermediate its ends, a variable resistance for the beam, a dash pot at one end of the beam intermediate said casing and standard, and a counterpoise upon the opposite end.

14. A scale comprising a base, a beam fulcrumed thereon and extending horizontally thereof, a variable resistance for said beam, an indicator operatively connected with one end of said beam and located at the rear of said base, a platform support on said beam between its fulcrum and the end thereof connected to said indicator, said platform being at one side of said indicator, and a poise beam located at the front of said base operatively connected with said first mentioned beam and extending upon opposite sides of the fulcrum thereof.

15. In a scale, the combination with a main beam bifurcated at one end, platform supporting means arranged above the beam intermediate said bifurcated portion one of the furcations thereof being relatively extended, of a weight depending from said extended portion.

16. In a scale, a base and a support thereon, in combination with a main beam bifurcated at one end, one of the furcations thereof being extended, of a weight depending from said extended portion, and an auxiliary beam having pivoted connections respectively with said extended furcation and the support upon the scale base.

17. In a scale, a main beam bifurcated at its outer end and having its inner end operatively associated with a variable resistance and an indicator, a platform resting upon the beam intermediate its fulcrum and its inner end, and an auxiliary beam connected to the main beam upon the opposite side of the fulcrum.

18. In a scale, the combination with a base, a beam fulcrumed adjacent the outer end thereof, a variable resistance and indicator for the beam operatively connected together adjacent the inner end, platform supporting means on the beam intermediate the fulcrum and said variable resistance and indicator, a platform on said supporting means and above the beam, and a counterpoise for the beam at the opposite side of the fulcrum.

19. In a scale, the combination with a base, of a platform, a beam having an enlarged open-centered part forming a support for said platform, said open-centered part having a portion thereof extending rearwardly to form a projection, fulcrum pivots on opposite sides of said enlarged portion, auxiliary weights removably associated with said projection, and an auxiliary beam operatively associated with said platform supporting beam.

20. In a scale, the combination with a beam, bifurcated to form separate fulcrum pivots, one of the furcations being relatively longer than the other, an auxiliary beam secured at one end to said elongated furcation, and at the other end to a stationary member of the scale, and auxiliary weights removably associated with said long furcation.

In testimony whereof I affix my signature in presence of two witnesses.

WALTER F. STIMPSON.

Witnesses:
  JAMES P. BARRY,
  EMMA I. BARNES.